United States Patent
Pan

[11] Patent Number: 6,044,232
[45] Date of Patent: Mar. 28, 2000

[54] METHOD FOR MAKING THREE-DIMENSIONAL PHOTOGRAPHS

[76] Inventor: Shaugun Pan, 168 N. Michigan Ave., Suite 700, Chicago, Ill. 60601

[21] Appl. No.: 09/022,409

[22] Filed: Feb. 12, 1998

[51] Int. Cl.$^7$ .................................................. G03B 17/24
[52] U.S. Cl. ............................................................ 396/330
[58] Field of Search ................................... 396/330, 339, 396/340

[56] References Cited

U.S. PATENT DOCUMENTS

| | | | |
|---|---|---|---|
| 3,503,316 | 3/1970 | Takano et al. | 396/330 |
| 3,678,833 | 7/1972 | Leach | 396/330 |
| 3,685,413 | 8/1972 | Matsunaga et al. | 396/330 |
| 4,825,234 | 4/1989 | Cai | 396/330 |
| 5,704,061 | 12/1997 | Anderson | 396/330 |
| 5,797,052 | 8/1998 | Day | 396/330 |

*Primary Examiner*—David M. Gray
*Attorney, Agent, or Firm*—Jeffrey T. Hubbard; Timmons & Kelly

[57] ABSTRACT

An improved method of 3-D photography is described that allows real-time production of 3-D photographs of a subject (10) with correct depth perception. A camera (12) moves along a linear track (20) for a predetermined distance, simultaneously rotating to maintain orientation toward the subject (10) being photographed. A holder (14) retains a lenticular screen (20) and a recording medium at the focal point of the camera (12). The combination of rotation and translation of the camera (12) results in the formation of a continuous stream of images from different perspectives being formed on the recording medium (18) located behind the lenticular screen (20). The lenticular screen (20) refocuses the images onto the recording medium (26). In one embodiment, the holder (14) is rotated relative to the camera (12) during the scanning process through a predetermined angle. This rotation makes the images from different viewing angles being recorded on different locations of the film, hence forming a real-time, composite, sampled image of the subject.

10 Claims, 2 Drawing Sheets

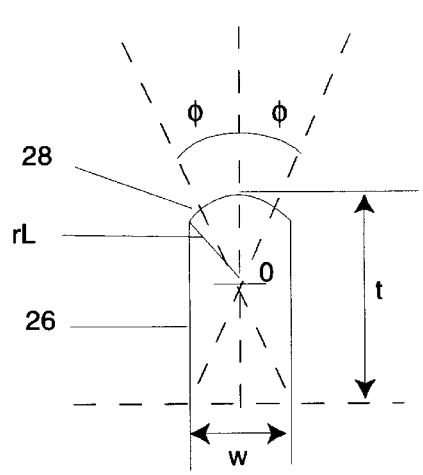
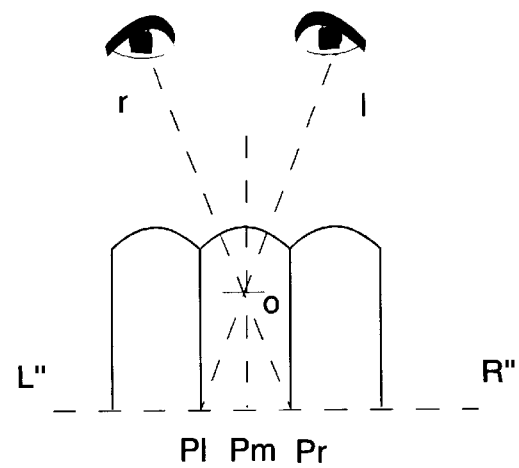
FIG.3  FIG.4
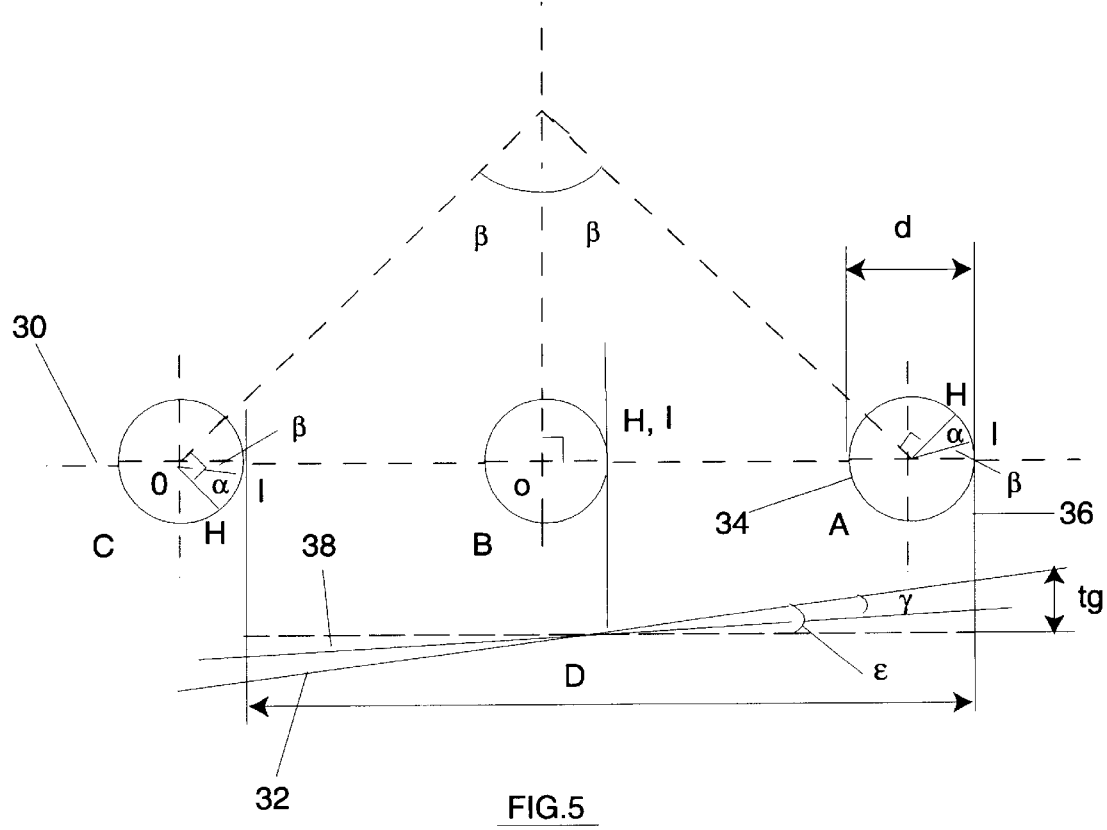
FIG.5

METHOD FOR MAKING THREE-DIMENSIONAL PHOTOGRAPHS

BACKGROUND

1. Field of the Invention

The present invention relates to both a method and an apparatus for three-dimensional photography, and specifically to a method in which both a camera and a lenticular screen move during a continuously scanning process and real-time combined 3-D static or animated photographs are produced.

2. Background of the Invention

We live in a three-dimensional (3-D) world. In this world, we see not only the height and width of an object, but also its depth. Traditional photography, however, produces only two-dimensional (2-D) photographs, i.e., photographs that only capture the height and width of an object. It has been a goal of many inventors for over a century to invent cameras that can take 3-D photographs.

The human visual system uses many visual cues to obtain 3-D perception. Visual disparity is the most effective of these cues. When we focus on an object, the two eyes look at it from different perspectives. The difference in perspective results in a slight difference in the images received by the two eyes, i.e., the right eye sees more of the right side of the object than the left eye, and vice versa. The human visual system possesses the ability to combine the two slightly different perspectives and extract the depth information (3-D) from the visual disparity of the corresponding image points. The principle of a 3-D camera is to produce images that carry information of visual disparity. When these images are viewed by human eyes, the visual disparity embedded in the images can be observed and thus the depth or 3-D sensation perceived.

There are several methods for making 3-D photographs. One method is binocular stereoscopic imaging, in which a pair of images is produced. The two images are taken from two spatially separated positions, either by two cameras or by one moving camera. The two images are then viewed through a device, which allows the observer to see the left image only with the left eye and the right image only with the right eye. The viewer's brain combines the two images into a single 3-D image. The viewing angle for a device using this method is very limited. An observer can properly view the 3-D image at only one viewing angle. If his eyes are moved away from the right position, the 3-D perception will be distorted or lost (see Ferwerda J. G., The World of 3-D: A practical guide to stereo photography, 1990, Borger: 3-D Book Productions).

Three-dimensional spatial imaging (also called autostereoscopy) is a significant improvement over binocular stereoscopic imaging. In autostereoscopy, several (more than two) images are taken and later combined to form one single 3-D image. Such an autostereoscopic image conveys much more information (dependent on the number of images combined) than that of a binocular stereoscopic image. An observer views such an image through a device such as a lenticular screen or a barrier screen. By changing his viewing angle, the viewer will get the impression of seeing the same object from different perspectives semi-continuously. This is similar to seeing an object in the real world (see McAllister D. F., Stereo Computer Graphics and Other True 3D Technologies, 25 1993, N.J.: Princeton University Press).

A simple method for taking autostereoscopic images is to use a multi-lens camera (with the lenses either in the same camera housing or in different camera housings), or a single camera placed in many different spatial positions. The multiple photographs are then combined in certain ways (either using an optical device or a computer) to form a single 3-D photograph. U.S. Pat. No. 5,337,096 and U.S. Pat. No. 4,800,407 disclose the kind of cameras used with this method. One of the major disadvantages about this method is that the 3-D perception of such an image is discontinuous: when an observer moves his head while viewing such a 3-D photograph, there is a noticeable jump from one image to the next. This jumpiness is due to the limited number of discrete images that are used to form the final photograph. Another disadvantage of the method is that the recorded 3-D image cannot be viewed directly from the developed image. In order to get a viewable 3-D image, a post-processing procedure (i.e., the combining process) must be done, which can be rather expensive and inaccurate.

A much better way to achieve autostereoscopy is to simulate the eye's view by continuously scanning the subject being photographed using a device employing a single-lens camera. The device possesses means for moving the camera in order to scan the subject being photographed over a continuously changing angle. The continuous scanning method greatly increases the information contained in the photograph, so that a photograph taken this way can produce strong 3-D perception. Such a scanning camera is usually combined with a lenticular screen or a barrier, placed close to the focal plane of the camera and in front of a photosensitive film used for recording images. The combination of a moving camera and a lenticular screen produces a 3-D photograph that can be viewed directly, without all the complex post-processing required in the multi-lens method.

U.S. Pat. No. 2,508,487 discloses a continuously moving camera structure and the method of using it. In this design the camera follows a path in a circular arc about a fixed center at which the subject is located. During the scanning process, the camera is always oriented towards the subject being photographed. A lenticular screen and a strip of film rotate around a vertical axis in synchronization with the camera during scanning of the image. The range of operation of this camera is limited because the distance between the subject being photographed and the camera is predetermined by the radius of the circular track, and is therefore fixed.

U.S. Pat. No. 4,107,712 describes another camera design and scanning method. In this design, the camera position is fixed throughout the scanning. A small aperture shutter, adjacent to a large lens, moves sideways during the exposure and scans the incoming light throughout the length of the lens in a horizontal direction. A lenticular screen moves a predetermined small distance along a linear path in the same direction as the moving shutter, relative to the static film and camera. The disadvantages of this method are: (1) it requires a large and high-quality lens, which is difficult and expensive to produce, (2) the scanning distance of the aperture is relatively small, hence the 3-D perception of a photographs taken by such a camera is weak, and (3) the relative small movement of the lenticular screen (about one pitch) requires a very precise motor control system. Small errors in movement of the elements during scanning can reduce the quality of the resulting 3-D photograph.

OBJECTS AND ADVANTAGES

As already discussed, there have been many prior art designs in 3-D photography. There are, however, various problems that prevent those designs from obtaining natural 3-D photographs with high quality.

It is therefore an object of the present invention to produce an improved 3-D photograph, with a continuous range of viewing angles, having more realistic three-dimensional appearance than that achieved by prior art methods.

In order to obtain the desired realism in the resulting photograph, another object is to scan the subject over a relatively large angle.

It is also an object of the present invention to produce 3-D photographs that do not require any of the post-scanning procedures (except film developing) required in prior art methods.

Another object is to reduce or eliminate any flicker effect when viewing the resulting 3-D photographs. This flicker effect is caused by underexposure or overexposure of the area under each lenticule.

Yet another object is to provide a method that can be performed without a large amount of supervision by the operator, especially in regards to control of the relative movements of the camera, the lenticular screen, and the subject.

Another object of the invention is to record images having direct depth information (as opposed to reversed depth information, in which foreground objects appear to be in the background and visa versa), without the need for post-processing procedures.

Other objects, features, and advantages of the present invention will be disclosed in the detailed description and the accompanying drawings which follow, and in part will be apparent to those skilled in the art.

SUMMARY OF THE INVENTION

In general, the present invention achieves the foregoing and other objects and advantages by a method of recording images that possess 3-D perception, with real-time combination of the correct (instead of reversed) depth information, using a single-lens camera, a lenticular screen, and a recording medium.

In one embodiment, the camera is moved along a linear path, and is rotated during this movement to keep the camera aimed at the subject being photographed. The lenticular screen and the recording medium simultaneously rotate relative to the camera lens.

In another embodiment, the camera also moves along a linear path, and is rotated to maintain the camera's orientation toward the subject. In this embodiment however, the lenticular screen and the recording medium are moved linearly along the camera's focal plane as the camera traverses its path.

In yet another embodiment, the method is used to record time dependent differences in the subject rather than differences in viewing angle, animation of the subject. In this embodiment, the camera is maintained at a fixed position, and the lenticular screen and recording medium are moved relative to the camera in one of the ways already described.

Various types of apparatus can be employed to achieve the method of the invention. While mechanical systems using gears, racks, guides, etc. can be used, electromechanical systems having servomotors, solenoids, etc. can also be employed. In addition, the recording medium can be photographic film or other means of recording an image, such as a charge-coupled device matrix or vidicon tube.

The method and apparatus have the advantage that the subject need not be located at the center of a circular arc, but can located within a range of distances from the apparatus. The guiding system then adjusts movement of the camera and lenticular screen to maintain orientation toward the subject during scanning. Another advantage is that the method produces images having continuously variable viewing angle, rather than the jumpier, step-wise images produced by traditional methods. In addition, the method can produce images that can be viewed immediately after scanning, without any post-scanning procedures being necessary (other than development of photographic film, when such film is used as the recording medium) to make the images suitable for viewing.

BRIEF DESCRIPTION OF THE DRAWINGS

FIG. 2, comprising

FIG. 3 is a cross-sectional view of an individual lenticule in the lenticular screen.

FIG. 4 shows the viewing situation of the center of the image.

FIG. 5 is a schematic representation of a mechanical movement control system used in practicing the method of the invention.

DETAILED DESCRIPTION OF THE PREFERRED EMBODIMENTS

The present invention describes a method whereby a camera records images that possess 3-D perception, with direct production of orthostereoscopy, i.e., preservation of the correct (instead of reversed) depth information. The subject will usually have several individual components in both the foreground and background, but there will generally be one key subject 11 that will be the center of focus for the equipment to be discussed.

Figure 1:
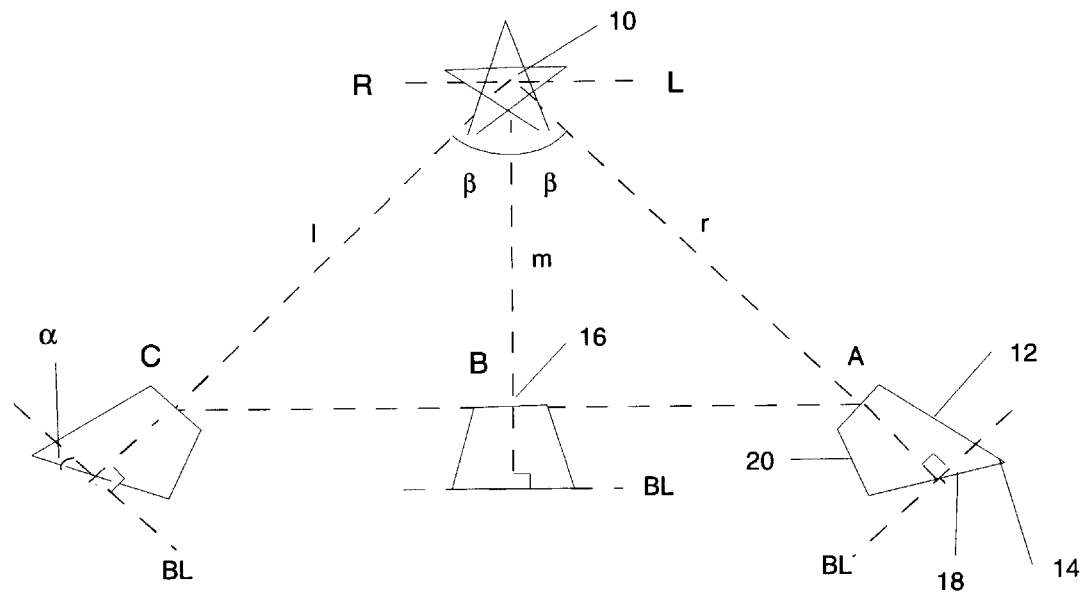
FIG. 1 is an illustration of the principle of the method according to the present invention.

As shown in FIG. 1, a camera 12 having a single lens (not shown) scans a subject 10. The subject 10 can be made up of several elements, including a key subject 11 that is located at the focal point of the camera 12. The camera 12 rotates on a first pivot 16 that in turn moves along a linear path ABC during scanning of the subject 10. The rotation and translation of the camera 12 are controlled to keep the camera 12 and lens pointed toward the key subject 11 during the entire scanning process. Because the camera 12 faces the key subject 11 during the whole scanning process, this method ensures the most effective use of the camera aperture in producing 3-D photographs (only the overlapping area of different images can produce 3-D sensation).

To obtain a realistic 3-D sensation, the camera 12 should continuously scan with a large scanning angle about the subject 10 being photographed. The continuously scanning method ensures that the observer can get a panoramic impression, i.e., by viewing the 3-D photograph and moves his head at the same time, the observer will seem to 'pan' smoothly about the subject rather than perceiving discrete images jumping from one to another. The scanning angle of the camera is defined as the angle formed at the vertex of the light rays from the camera to the key subject 11 at the camera's extreme right and left positions. This angle will be increased if the linear distance traversed by the camera 12 is increased, or the distance from the camera 12 to the subject is decreased. The preferred embodiment uses a relatively large traversal distance of the camera 12 to achieve a large scanning angle.

In the figure, capital letters L and R indicate the left side and right side of the subject space, respectively. Dotted lines labeled r, m, and l indicate the principle light rays coming to the camera 12 at two extreme locations A and C along the path ABC, and at an intermediate location B. The included angle 2β between light rays r and l describes the viewing angle in the subject space that is scanned by the camera 12. At the rear of the camera 12 is a holder 14. The holder 14 retains a recording medium 18, usually a strip of photographic film, and a lenticular screen 20 directly in front of the recording medium 18.

The movement of the holder 14 and the associated elements will now be discussed. If the holder 14 is held fixed with respect to the camera 12 throughout the scanning distance, the images from different viewing angles will fall on the same point on the recording medium 18. If photographic film is used for recording the image, no 3-D perception will be achieved because the images from different viewing angles are exposed over each other. In order to produce separate images, the holder 14 must move relative to the camera 12. As shown in FIG. 1, the holder 14 rotates around a second pivot 22 during the scanning process. At position A, the holder 14 is canted clockwise to a baseline BL (dashed line), which is contained in the focal plane of the camera 12. At position B, the holder 14 is collinear with the baseline BL, and at position C, the holder 14 is canted counterclockwise to the baseline BL.

Any errors in overall movement control will degrade the quality of the resulting images. For example, if the relative movement between the camera 12 and the lenticular screen 20 is not precisely controlled, the resulting 3-D image may be underexposed or overexposed. Therefore, it is critical that the movement of both the camera 12 and the holder 14 is precisely controlled during the scanning process. It is also preferable that the characteristics of the movements (e.g. total distance traveled, total angle of rotation, etc.) be easily adjustable to permit more flexible operation, such as allowing the subject 10 to be located at varying distances from the apparatus.

Figures 2A, 2B, 2C:
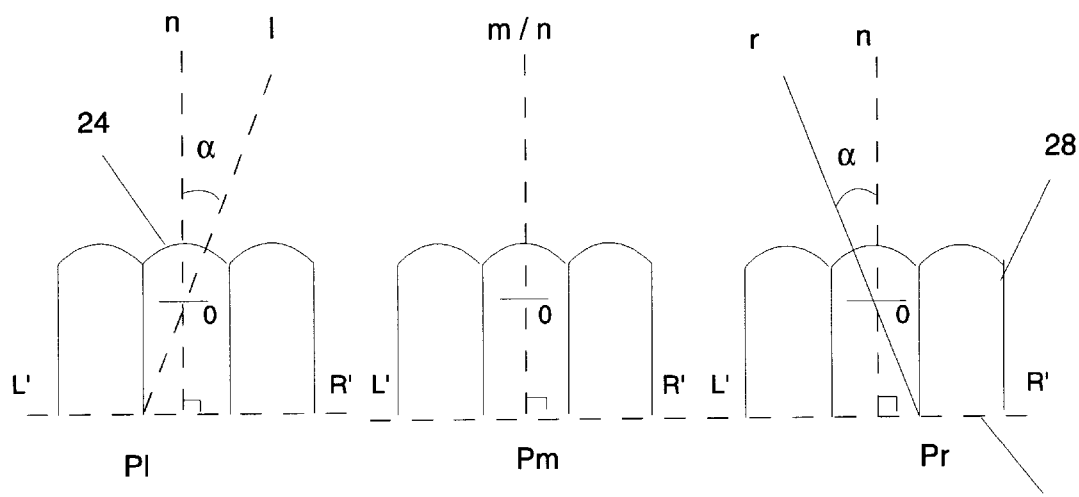
FIGS. 2A–2C, is a cross-sectional view of the imaging process through the lenticular screen at different scanning positions.

FIGS. 2A to 2C show the imaging process occurring at the central part of the lenticular screen 20 for the three scanning positions A, B, and C. Only the central lenticule 24 and its two immediate neighbors 26 and 28 are shown in the figures. Capital letters L' and R' indicate the corresponding images of the left and right sides L and R of the subject space, as already discussed. Pr, Pm, and Pl are image points of the principle light rays r, m, and l on the recording medium 18. It is assumed that all the principle light rays pass though the optical center 0 of the lenticule 24. The direction of the light rays is therefore not changed by refraction within the lenticule 24. It should be noted that each image point is formed by a light beam with a non-zero width, even though only the principal light ray is shown in the figures.

The geometry of the layout dictates that the angle formed between the principal light rays in each case and the normal to the lenticular screen (designated by the letter n) are determined by the angle between the holder 14 and the baseline BL. This angle is equal to a at positions A and C and is zero at position B. The scanning angle of the lenticular screen 20 is thus 2α.

FIG. 3 shows the cross-sectional configuration of the lenticule 24, and is representative of all lenticules in the lenticular screen 20. It has an optical center 0, a front face 28 defined by a circular arc with radius rL, a width w, and a thickness t. The viewing angle of the lenticule 24 is 2φ, which is determined by the formula $$2\varphi = 2\arctan\left(\frac{w}{2t - 2rL}\right) \quad 1)$$

Assuming that photographic film is used as the recording medium 18, the viewer will see dark stripes across underexposed areas of the photograph when viewing the image at different angles. If the film is overexposed, the viewer will see bright stripes instead. Underexposure results when the scanning angle 2α of the lenticular screen 20 is smaller than the viewing angle 2φ of the individual lenticule 24. Overexposure results when the scanning angle 2α of the lenticular screen 20 is larger than the viewing angle 2φ of the individual lenticule 24. Therefore, to produce a high quality 3-D image, the scanning angle 2α of the lenticular screen 20 should be equal to the viewing angle 2φ of the individual lenticule 24.

An advantage of the present method is that it produces a developed image that does not require post-developing processing. This is because the resulting image contains the correct depth information. If a lenticular screen is put in a regular camera and no other adjustment is added, inversion of the image by the individual lenticules 24, 26, 28, etc. produces a 3-D photograph with reversed depth, i.e., foreground objects will appear to be in back and visa versa, when the orientation of the whole photograph is correct. A detailed explanation of how this reversal is produced can be found in U.S. Pat. No. 4,621,897. The method of the present invention eliminates this reversal by the rotation of the lenticular screen 20 relative to the camera 12.

FIG. 4 shows the method for viewing a 3-D image produced by the camera 12. It should be noted that the left and right orientation of the image, labeled by L" and R" respectively, is consistent with the original sides of the subject space L and R. When an observer views this image with both eyes, the right eye Er perceives light rays coming from image point Pr, and the left eye El perceives light rays coming from image point Pl. As already shown in FIG. 2, the image points Pr and Pl are formed by principal light rays r and l, i.e. the right and left perspectives of the subject 10 in the subject space. Therefore, the observer's right eye gets the right perspective and the left eye the left perspective of the subject 10. This ensures that the correct depth perception is obtained from the 3-D photograph.

FIG. 5 shows a schematic view of a device capable of carrying out the method of the present invention. The mechanism described here can be used to control the scanning process of the camera 12 and the movement of the lenticular screen 20 relative to the camera 12. The mechanical structure for movement of the camera includes a track 30, a guide 32, a pinion gear 34 having a diameter d, and a rack 36. A similar combination of gear and rack are used to control the movement of the holder 14. The camera is mounted on the gear 34 with the focal plane parallel to the radius OH on the gear 34. The camera 12 is driven along the track 30 by a motor drive (not shown). The rack 36 is kept perpendicular to the track 30, and slides along the guide 32 while in tight contact with the gear 34. At position B the radius OH of the gear 34 is parallel to the track 20, and the camera 12 faces the key subject 11 perpendicular to the track 30. As the gear 34 moves to position A, the guide 32 biases the rack 36 upward by a distance lg. Because the rack 36 is in contact with the pinion gear 34, a linear movement of lg for the rack 36 results in a rotation of the gear 34 through an arc having arc length lg. The angle of rotation β can be determined by the formula:

$$\beta = 2\frac{lg}{d} \text{ radians} \qquad 2)$$

Where d is the diameter of the gear 34. When the gear 34 moves from position B to the leftmost position of scanning, position C, the rack 36 rotates the gear by a clockwise angle β. Thus, the total scanning angle of the camera 12 is 2β. The angle between the guide 32 and the track 30 is ε, which is related to the angle β by the formula $$\beta = D\tan\frac{\varepsilon}{d} \text{ radians} \qquad 3)$$

Where D is the length of the scanning path ABC.

A second guide 38 controls the rotation of the holder 14 relative to the camera 12, utilizing the same principle as described in the last paragraph. Because the angle γ between the two guides 32 and 38 is usually small (less than ten degrees), the angle γ can be determined by the approximation $$\gamma \approx \tan\gamma \qquad 4)$$

Where γ is in radians. If the holder 14 is mounted on a second gear (not shown) that has the same diameter as the pinion gear 34, then the angle γ between the guides 32 and 38 is related to the lenticular screen scanning angle 2α of the lenticular screen by $$\gamma = \frac{\alpha d}{D} \qquad 5)$$

The scanning angle 2α for a particular lenticular screen can therefore be set before a scanning session by adjusting the angle γ between the guides 32 and 38 according to the above formula.

Numerous variations are possible in the previously described embodiments. For example, rotation of the camera 12 and the holder 14 can be accomplished by electromechanical servomotors instead of the guiding system described here. When a servo motor system is used, the rotations of the camera 12 and the holder 14 are independent. Both movements can then be controlled as numerous different functions of the scanning position along the track 30. One such variation can be that the lenticular screen 20 is moved along a linear path parallel to the camera's focal plane during scanning while the camera 12 rotates around the key subject 11. Other means of recording images can also be employed. While the recording medium 18 in the previous discussion has been assumed to be photographic film, a charge-coupled device matrix or vidicon tube can be used, so that images can be stored electronically for display on a monitor, making digital 3-D photography possible. Other means for recording images known in the art can also be used.

Finally, the method of the invention can be used for recording changes in the subject with time, rather than with change in viewing angle. In other words, the method can be used for 3-D animation photography. When used in animation, camera 12 is usually fixed at the center of the track 30 in FIG. 5, facing the key subject 11. The holder 14 is then rotated about the second pivot while the subject 10 moves. The images formed at different moments are recorded at different places under each lenticule. Viewing the image produced by this embodiment will then reproduce the movement of the subject 10.

The method of the invention has been described in several embodiments. It should be apparent to those skilled in the art that the invention is not limited to the disclosed embodiments, but is capable of being modified and varied without departing from the scope of the invention as set out in the attached claims.

What is claimed is:

1. A method for producing a viewable three-dimensional image of a subject using a camera, a substantially planar lenticular screen, and a substantially planar recording medium, comprising the steps of:

moving the camera along a substantially linear path;

rotating the camera about a first pivot simultaneously with the movement along the path, for maintaining orientation of the camera toward a key subject; and moving the lenticular screen and the recording medium together relative to the focal plane of the camera in coordination with the movement of the camera along the path, such that the movement of the lenticular screen and the recording medium is proportional to the angle formed between the subject, the camera at a particular point along the path, and the camera at the midpoint of the path.

2. The method recited in claim 1, wherein the lenticular screen and the recording medium rotate through a scanning angle about an axis lying substantially in the focal plane of the camera, in a proportional relationship to the distance traveled by the camera from the midpoint of the path.

3. The method recited in claim 2, wherein the lenticular screen comprises a series of identical contiguous lenticules each having a viewing angle defined by the shape of the lenticule, and the scanning angle covered by rotation of the lenticular screen and the recording medium is equal to the viewing angle of the lenticule.

4. The method recited in claim 1, wherein the lenticular screen and the recording medium move in a linear path parallel to the focal plane of the camera as the camera moves along the path, such that light from the subject falling on the recording medium from the camera covers a continuous range of angles.

5. The method recited in claim 4, wherein the lenticular screen comprises a series of identical contiguous lenticules each having a viewing angle defined by the shape of the lenticule, and the continuous range of angles covered by light from the camera falling on the recording medium is equal to the viewing angle of the lenticule.

6. A method for producing an animated, directly viewable three-dimensional image of a subject using a camera, a substantially planar lenticular screen, and a substantially planar recording medium, comprising the steps of:

holding the camera fixed toward a key subject; and moving the lenticular screen and the recording medium together relative to the focal plane of the camera over a period of time so that the images formed on the recording medium cover a range of angles equal to the viewing angle of an individual lenticule in the lenticular screen.

7. The method recited in claim 6, wherein the lenticular screen and the recording medium rotate through a scanning angle about an axis lying substantially in the focal plane of the camera.

8. The method recited in claim 7, wherein the lenticular screen comprises a series of identical contiguous lenticules each having a viewing angle defined by the shape of the lenticule, and the scanning angle covered by rotation of the lenticular screen and the recording medium is equal to the viewing angle of the lenticule.

9. The method recited in claim 6, wherein the lenticular screen and the recording medium move in a linear path parallel to the focal plane of the camera, such that light from the subject falling on the recording medium from the camera covers a continuous range of angles.

10. The method recited in claim 9, wherein the lenticular screen comprises a series of identical contiguous lenticules each having a viewing angle defined by the shape of the lenticule, and the continuous range of angles covered by light from the camera falling on the recording medium is equal to the viewing angle of the lenticule.

* * * * *